(No Model.) 2 Sheets—Sheet 1.

W. SOOY SMITH.
APPARATUS FOR SINKING SHAFTS THROUGH QUICKSAND.

No. 371,389. Patented Oct. 11, 1887.

Witnesses:
L. C. Hills
W. B. Masson

Inventor:
William Sooy Smith
by E. E. Masson
atty.

(No Model.) 2 Sheets—Sheet 2.
W. SOOY SMITH.
APPARATUS FOR SINKING SHAFTS THROUGH QUICKSAND.
No. 371,389. Patented Oct. 11, 1887.
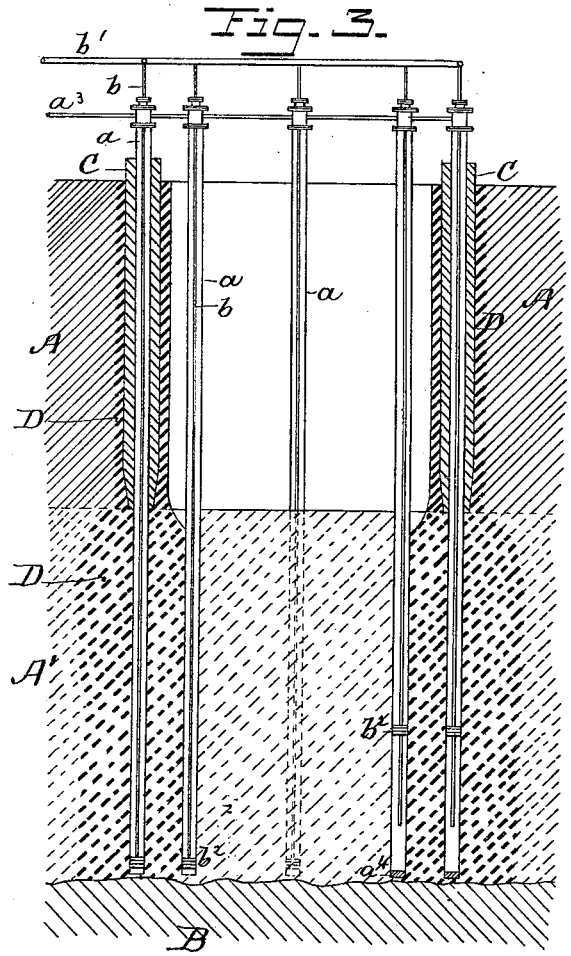
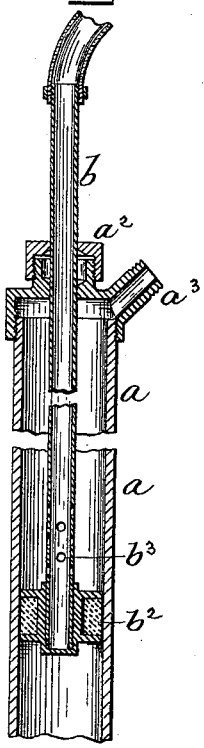
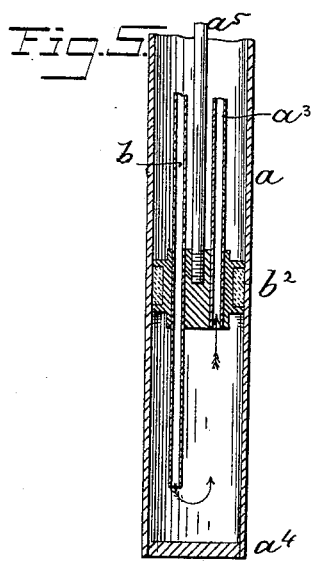
Witnesses:
L. C. Hills
W. B. Masson
Inventor:
William Sooy Smith
by E. E. Masson
atty.

UNITED STATES PATENT OFFICE.

WILLIAM SOOY SMITH, OF CHICAGO, ILLINOIS.

APPARATUS FOR SINKING SHAFTS THROUGH QUICKSAND.

SPECIFICATION forming part of Letters Patent No. 371,389, dated October 11, 1887.

Application filed March 28, 1885. Serial No. 160,512. (No model.)

*To all whom it may concern:*

Be it known that I, WILLIAM SOOY SMITH, a citizen of the United States, residing at Chicago, in the county of Cook and State of Illinois, have invented certain new and useful Improvements in Apparatus for Sinking Shafts Through Quicksand, of which the following is a specification, reference being had therein to the accompanying drawings.

My invention relates to means for sinking shafts and boring tunnels through quicksand and other water-carrying strata, and is an improvement upon the invention of F. H. Poetsch, patented June 24, 1884, No. 300,891; and it consists in the means for protecting the ground to be excavated against intense cold, and also thawing said ground if frozen, to facilitate excavating therethrough, the method for the same being described in my patent of April 20, 1886, No. 340,384.

Figure 1:
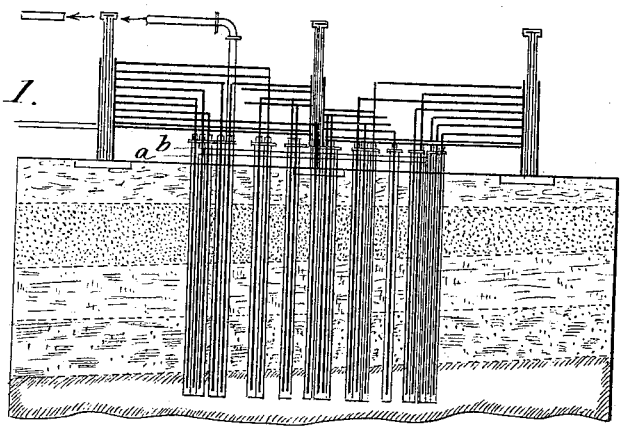
Figure 2:
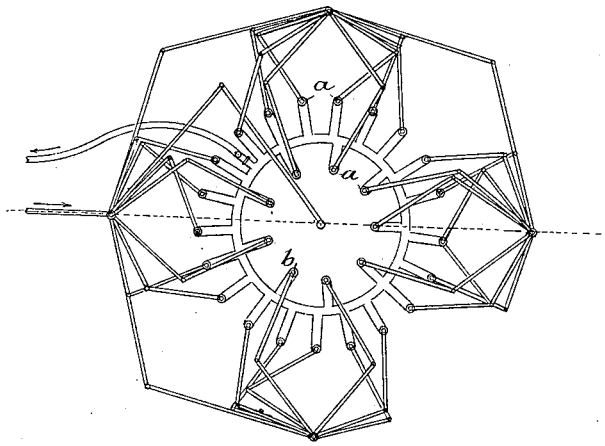

In the accompanying drawings, Figure 1 is a vertical section through earth and water-carrying strata, with the freezing apparatus in position. Fig. 2 is a plan of the same, and said apparatus is similar to the invention shown in the patent of Poetsch. Fig. 3 is a vertical section through strata to be excavated, showing two of the incased pipes. Fig. 4 is a vertical section of one of the pipes used to carry either the freezing or the thawing medium. Fig. 5 is a modification of the same.

In the drawings, A represents a compact bed of earth or other stratum nearly impervious to water, and A' a stratum of quicksand. A series of pipes, $a$, placed at proper distances from each other, are driven through the soil and water-bearing strata until they reach either the bed-rock B or stiff clay, where it may be intended to stop the excavation. The pipes $a$ inclose pipes $b$, that are connected at the top with one or more receiving-pipes, $b'$, through which the freezing medium is conducted to the pipes $b$, and the latter directs it to a point adjacent to the bottom of the pipe $a$, from which it ascends again around the pipes $b$ to the top of the pipes $a$, and is returned to the freezing-machine. The amount of ground frozen by this method generally extends so far within the limits to be excavated as to greatly increase the amount of labor necessary to produce the desired excavation. The object of my invention is to reduce this labor to a minimum. For this purpose the upper portion of the pipe $a$, that passes through the stratum, A, that may be compact earth or it may be water only, is incased in a hollow pile, C, preferably made of wood suitably bored, or made of a number of pieces of wood fastened together, and said pile is driven with the pipe $a$ in one of the ways well-known in engineering. This pile C prevents the diffusion of cold to any great distance therefrom, as shown by heavy section-lines at D, and permits the freezing medium to reach the lower portion of the pipe $a$ in an unimpaired condition, and by this means the amount of frozen material, D, around said lower portion of the pipe $a$ is much larger than in the upper portion; but, as above stated, the amount of frozen material may extend too far in the interior of the proposed excavation, and to thaw this portion is also the object of my invention. For this purpose there is driven within the peripheral limits proposed for the excavation another series of pipes, $a$, and within each of them is placed a small pipe, $b$, passing through a stuffing-box, $a^2$, in the cap of the larger pipe. At the lower end of the pipe $b$ is secured a plug or piston, $b^2$, to close the interior of the pipe $a$ at any desired point, and just above said piston the pipe $b$ has a series of perforations, $b^3$, through which a medium of warmth—as steam, hot-air, or water—can issue into the larger pipe and the latter transmit its caloric and thawing properties to the ground surrounding it, after which it escapes through the pipe $a^3$ at the upper end of the large pipe $a$.

In Fig. 5 the pipe $a$ is shown as closed at the bottom by a plug, $a^4$. The medium of warmth is conducted through the pipe $b$ under the piston $b^2$, where it transmits its caloric to the pipe $a$ and escapes through the pipe $a^3$. A rod, $a^5$, is attached to the piston, by which means its position within the pipe $a$ can be regulated from above. The same means could be applied to excavations for tunnels in any direction and for any purpose, and the same pipes used to bring in the freezing medium may afterward be used to conduct the thawing medium to the desired point, as the position of the piston $b^2$ can be adjusted.

Having now fully described my invention, I claim—

1. The combination of the exterior freezing-pipes closed at the lower ends, and having tubular cast-iron heads provided with stuffing-boxes and lateral T-pipes, interior supply-pipes passing through said stuffing-boxes, and having openings at their lower ends and return-pipes connected to the T-pipes of the tubular heads, and hollow piles inclosing the exterior freezing-pipes for a portion of their length, substantially as set forth.

2. A device consisting of an outer pipe having a cap provided with an outlet-pipe and a stuffing-box, and an inner pipe passing through said stuffing-box, and having its lower end provided with a piston or plug fitting in the outer pipe, substantially as and for the purpose described.

In testimony whereof I affix my signature in presence of two witnesses.

WILLIAM SOOY SMITH.

Witnesses:
E. L. ABBOTT,
CHAS. SOOY SMITH.